G. HALLGREN.
CALIPERS, DIVIDERS, OR THE LIKE.
APPLICATION FILED MAR. 27, 1920.
1,367,776.
Patented Feb. 8, 1921.
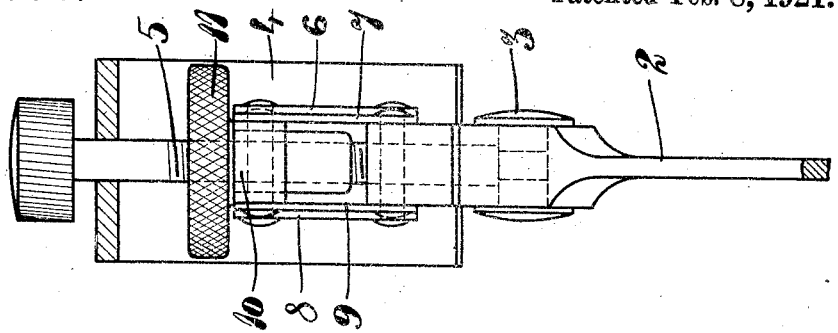
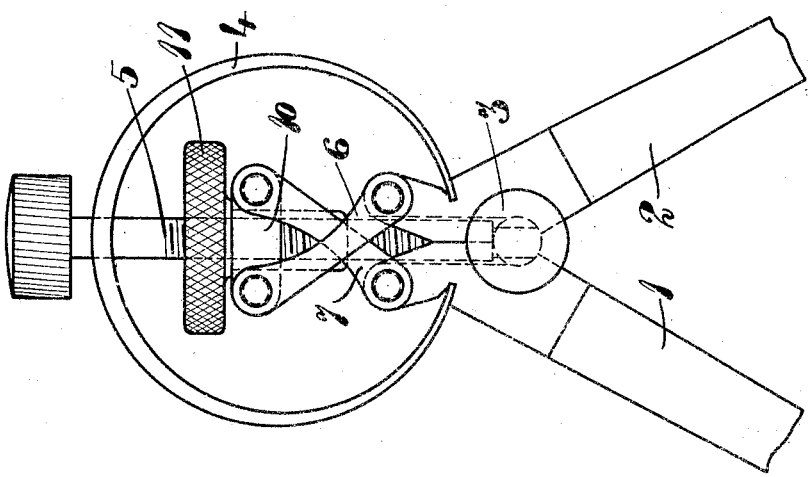
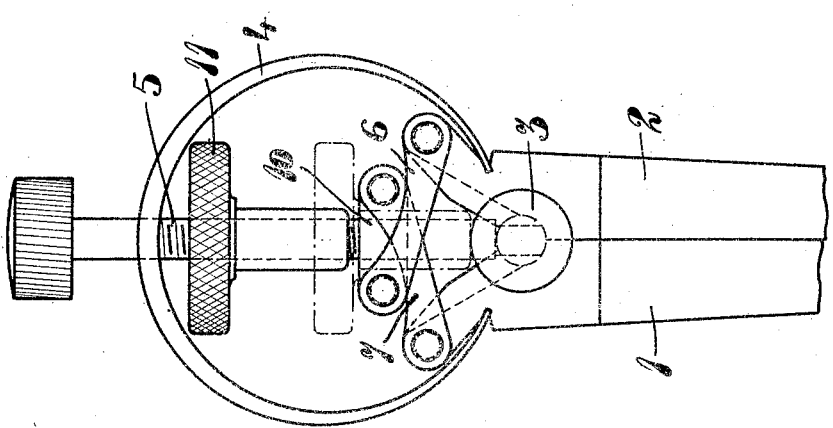
Inventor.
Gösta Hallgren
By Henry Orth Jr atty

UNITED STATES PATENT OFFICE.

GÖSTA HALLGREN, OF FALKÖPING-RANTEN, SWEDEN.

CALIPERS, DIVIDERS, OR THE LIKE.

1,367,776.  Specification of Letters Patent.  Patented Feb. 8, 1921.

Application filed March 27, 1920. Serial No. 369,332.

*To all whom it may concern:*

Be it known that I, GÖSTA HALLGREN, a citizen of the Kingdom of Sweden, residing at Falköping-Ranten, Sweden, have invented new and useful Improvements in Calipers, Dividers, or the like, of which the following is a specification.

Calipers, dividers or the like are known to be provided with a threaded rod attached to the pivot of the calipers or dividers. Such instruments have a nut adapted to be screwed along said rod for effecting the movements of the shanks against or by the action of a spring. The spring being preferably circular inclosing the rod, which passes through it, the nut being connected with the adjacent ends of the shanks by means of links. Moreover, calipers or dividers of this type are frequently so constructed, that the spring tends to move the points of the shanks together. It has been proposed to so place said links that the points connecting each link with the end of a shank and the nut are positioned on either side of a plane passing through the rod along the pivot.

The instruments constructed in this manner are inconvenient in that the adjustment of the points of the shanks take place only to the extent to which the nut is screwed along the rod, because the ends of the links adjacent to the nut are connected with the same, and owing thereto the movements of the shanks are comparatively slow and the adjustment of the points taking a rather long time.

This invention relates to calipers, dividers or the like of the above named type and has for its object to prevent the said inconvenience, it being possible to adjust the points of the shanks, even in case of great distances, more rapidly than in the use of instruments of the type described above.

This result is attained by the spring being so placed as to move the shanks apart, the ends of the links adjacent to the nut not being connected with the same but with a sleeve movable along the rod, the nut being adapted to be screwed along the rod independently of the shanks and the links. The sleeve is so placed as, when moved along the rod by the action of the spring and the connection with the links, to be stopped by the nut according to the adjusted position of the same.

A preferred embodiment of the invention is illustrated in the accompanying drawing in which—

Figures 1 and 2 are different side views of the upper portion of a pair of calipers constructed according to the invention. Fig. 3 is an edge view of the same calipers, the spring being shown in section.

Referring to the drawing, 1 and 2 are the two shanks of the calipers, 3 their common pivot, 4 the flat spring actuating the shanks, 5 the threaded rod secured to the pivot. 6, 7 and 8, 9 are the pairs of links placed at either side of the rod 5 and pivotally connected with the ends of the shanks. As will appear from Figs. 1 and 2, the links of each pair are arranged crosswise.

In this case the spring 4 is so placed as to tend to move the shanks 1 and 2 apart. The ends of the links not connected with the ends of the shanks are pivotally secured to a sleeve 10 adapted to be moved along the rod 5. The nut 11 placed on the rod may be screwed up and down on the same independently of the sleeve 10 and the links 6, 7 and 8, 9 or the shanks 1 and 2.

If for instance the shanks are to be adjusted from the position shown in stippled lines in Fig. 1 to the position shown in Fig. 2, the shanks are grasped with one hand and held against the action of the spring, the fingers of the other hand striking against the milled edge of the nut 11 thus screwing the nut rapidly upward about to the position shown in Figs. 1 and 2 in full-drawn lines. When then releasing the shanks, the spring 4 moves them apart while raising the sleeve 10 until the latter is stopped by the nut. If exact adjustment of the shanks then be necessary, this is effected by screwing the nut along the rod 5. If the shanks are to be adjusted in opposite direction, they are moved together, the sleeve 10 thereby being moved downward, and the shanks are held by one hand, while screwing the nut downward in the manner described to a position about corresponding to the position desired, the shanks then being released and the sleeve forced against the nut by the spring 4. The exact adjustment is thereafter effected, if necessary.

Having now described my invention I declare that what I claim is:—

1. In a measuring instrument comprising two pivotally connected shanks, the combination of a pivot, a threaded rod attached to the pivot, a nut on said rod, a sleeve movable along the rod independently of the nut, members connecting said sleeve with adjacent ends of the shanks, and a spring tending to move the shanks apart and the sleeve toward the nut.

2. In a measuring instrument comprising two pivotally connected shanks, the combination of a pivot, a threaded rod attached to the pivot, a nut on said rod, a sleeve movable along the rod independently of the nut, members connecting said sleeve with adjacent ends of the shanks, and a spring tending to move the shanks apart and the sleeve toward the nut, the points connecting each member with the sleeve and a shank being situated at opposite side of a plane passing through the axes of the rod and the pivot.

3. In a measuring instrument comprising two pivotally connected shanks, the combination of a pivot, a threaded rod attached to the pivot, a nut on said rod, a sleeve movable along the rod independently of the nut, a pair of links placed at either side of the rod and connecting said sleeve with adjacent ends of the shanks, and a spring tending to move the shanks apart and the sleeve toward the nut.

4. In a measuring instrument comprising two pivotally connected shanks, the combination of a pivot, a threaded rod attached to said pivot, a nut on said rod, a sleeve movable along the rod independently of the nut, a pair of links placed at either side of the rod and connecting said sleeve with adjacent ends of the shanks, and a spring tending to move the shanks apart and the sleeve toward the nut, the points connecting each link with the sleeve and a shank being situated at opposite sides of a plane passing through the axes of the rod and the pivot.

5. In a pair of calipers, the combination of a pivot connecting the shanks of the pair of calipers, a threaded rod attached to said pivot, a nut on said rod, a sleeve movable along the rod independently of the nut, a pair of links placed at either side of the rod and connecting said sleeve with adjacent ends of the shanks, and a spring tending to move the shanks apart and the sleeve toward the nut, the points connecting each link with the sleeve and a shank being situated at opposite sides of a plane passing through the axes of the rod and the pivot.

In testimony whereof I have signed my name.

GÖSTA HALLGREN.